UNITED STATES PATENT OFFICE.

ALEXANDER L. STRAUS, OF BALTIMORE, MARYLAND.

PROCESS FOR MAKING A NON-ALCOHOLIC BEVERAGE.

1,223,121.              Specification of Letters Patent.     Patented Apr. 17, 1917.

No Drawing.      Application filed February 23, 1917. Serial No. 150,329.

*To all whom it may concern:*

Be it known that I, ALEXANDER L. STRAUS, a citizen of the United States, residing at Baltimore city, State of Maryland, have invented certain new and useful Improvements in Processes for Making a Non-Alcoholic Beverage, of which the following is a specification.

This invention relates to an improved process for treating alcoholic beer, and converting such beer into a non-alcoholic beverage having substantially the same properties and elements save the alcohol which has been eliminated.

In carrying out my process I use beer of the regular alcoholic character.

In order that the process may be thoroughly understood, and for purposes of describing the same, let it be assumed that the quantity processed in a single operation is one hundred barrels; this quantity is boiled in a brewer's kettle until all the alcohol is evaporated and eliminated.

The water in the beer which has also been evaporated in the boiling operation in the evaporation and elimination of the alcohol is restored by adding to the boiled product heated water equivalent to the quantity evaporated.

The boiling operation changes the character of the beer, and to effect a restoration of this character is the object of this process.

When the boiling operation is nearing its close, I add to every ten barrels of the product beverage one pound of salt, and a half hour before the boiling operation is completed I add one fifth of a pound of hops and two ounces of gum arabic per barrel of the boiling beverage. I next add one and three fourth pounds of granulated sugar per barrel of the beverage, and I next add to the entire beverage product now being boiled, and ten minutes before the boiling operation is completed, three pounds of concentrated hops, concentrated hops being of an entirely different character from ordinary hops in their action in the beverage, in that concentrated hops are pure hops, in which the dirt, seed and all impurities and foreign matter have been removed, and prevent turbidity in the finished product and add to its keeping qualities.

The temperature of the beverage product is now rapidly reduced to approximately four degrees centigrade, preferably by running it over a Baudelot cooler; I next add to the beverage while in the process of being cooled, one half to one ounce of liquid quassia per barrel of the beverage. This liquid quassia, I produce by taking one ounce of commercial quassia and boil it in a sufficient quantity of water to produce sixteen ounces of liquor, and I then add one half to one ounce of this liquor thus obtained, per barrel of the beverage while the beverage is being cooled in the Baudelot cooler. From the cooler the beverage is run into a chip-cask, and while in the chip-cask I add finings in the manner usual with the ordinary brewing of beer; I also add a suitable quantity of chill proofing preparation, preferably a pepsin compound known to the trade as "caluperline". While the beverage is in storage I add four commercial size tablets of meta-bisulfite of potassium, known to the trade as "K. M. S." or "kalium meta-sulfite tablets" per barrel. After the beverage product has been in storage from two to five days, it is then filtered and carbonated at from 15 to 16 pounds carbonic gas pressure, and is then ready for the market.

The process in detail involves the following:

First: Beer that has been brewed from malt, hops and cereals forming the basis.

Second: The elimination of all alcohol, and some of the water by boiling the beer.

Third: The restoration of the water by adding a quantity of heated water approximating that which was evaporated by the boiling of the beer.

Fourth: Adding one pound of salt to every ten barrels of the beverage product.

Fifth: Adding one fifth of a pound of hops and two ounces of gum arabic per barrel of the beverage product.

Sixth: Adding one and three fourth pounds of granulated sugar per barrel.

Seventh: Adding to the entire beverage product approximately ten minutes before the boiling operation is completed three pounds of concentrated hops.

Eighth: Rapidly reducing the temperature of the beverage to approximately four degrees centigrade.

Ninth: Adding one half to one ounce of quassia liquor per barrel.

Tenth: Adding the usual quantity of finings.

Eleventh: Adding chill proof preparation.

Twelfth: Adding four commercial size meta-bisulfite of potassium tablets per barrel.

Thirteenth: Storing the beverage from two to five days.

Fourteenth: Filtering and carbonating the beverage under 15 to 16 pounds carbonic gas pressure.

Fifteenth: Drawing off into packages ready for the market.

By the above described process a non-alcoholic beverage is produced from ordinary beer having substantially the taste, appearance, nutritious or extractive matter and other qualities of beer, save that it is non-alcoholic, in that it does not contain alcohol.

Having described my invention, what I claim and desire to secure by Letters Patent, is:—

A process for making a non-alcoholic beverage from fermented malt liquor, consisting in boiling the malt liquor to remove the alcohol and some of the water, adding heated water to the amount of that evaporated; adding salt, hops, gum arabic and sugar during the boiling operation; adding concentrated hops near the close of the boiling operation; rapidly reducing the temperature to approximately four degrees centigrade; adding one half to one ounce of liquid quassia per barrel; adding a suitable quantity of finings while the beverage is being cooled; adding chill proof preparation; adding four commercial size tablets of meta-sulfite of potassium per barrel while the beverage is in storage; permitting the beverage to remain in storage from two to five days; filtering and carbonating the beverage, and drawing it off in packages for the market.

In testimony whereof I affix my signature in the presence of two witnesses.

ALEXANDER L. STRAUS.

Witnesses:
E. WALTON BREWINGTON,
HOWARD D. ADAMS.